United States Patent
Wei et al.

(10) Patent No.: US 12,335,629 B2
(45) Date of Patent: Jun. 17, 2025

(54) IMAGING EXPOSURE CONTROL METHOD AND APPARATUS, DEVICE AND STORAGE MEDIUM

(71) Applicant: BEIJING BAIDU NETCOM SCIENCE TECHNOLOGY CO., LTD., Beijing (CN)

(72) Inventors: Shengyu Wei, Beijing (CN); Yuning Du, Beijing (CN); Cheng Cui, Beijing (CN); Ruoyu Guo, Beijing (CN); Shuilong Dong, Beijing (CN); Bin Lu, Beijing (CN); Tingquan Gao, Beijing (CN); Qiwen Liu, Beijing (CN); Xiaoguang Hu, Beijing (CN); Dianhai Yu, Beijing (CN); Yanjun Ma, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 211 days.

(21) Appl. No.: 17/885,035

(22) Filed: Aug. 10, 2022

(65) Prior Publication Data

US 2023/0164446 A1 May 25, 2023

(30) Foreign Application Priority Data

Nov. 25, 2021 (CN) .......................... 202111415433.X

(51) Int. Cl.
*H04N 23/73* (2023.01)
*G02F 1/133* (2006.01)
(Continued)

(52) U.S. Cl.
CPC ......... *H04N 23/73* (2023.01); *G02F 1/13306* (2013.01); *G06T 7/11* (2017.01); *G06T 7/80* (2017.01); *G06T 2207/20081* (2013.01)

(58) Field of Classification Search
CPC ...... H04N 23/73; H04N 23/61; H04N 23/631; G02F 1/13306; G06T 7/11; G06T 7/80;
(Continued)

(56) References Cited

U.S. PATENT DOCUMENTS

2009/0303347 A1    12/2009   Kwon et al.
2013/0194391 A1*   8/2013    Morrow ............... H04N 13/211
                                                              348/49
(Continued)

FOREIGN PATENT DOCUMENTS

CN          1592687 A       3/2005
CN        103067660 A       4/2013
(Continued)

OTHER PUBLICATIONS

Notice of Reasons for Refusal of Japanese application No. JP 2022119977 dated Jul. 12, 2023, 4 pages.

*Primary Examiner* — Christopher K Peterson
(74) *Attorney, Agent, or Firm* — Brooks Kushman P.C.

(57) ABSTRACT

An imaging exposure control method and apparatus, a device and a storage medium, which relate to the field of artificial intelligence technologies, such as machine learning technologies and intelligent imaging technologies, are disclosed. An implementation includes performing semantic segmentation on a preformed image to obtain semantic segmentation images of at least two semantic regions; estimating an exposure duration of each semantic region based on the semantic segmentation image and the preformed image; and controlling exposure of each semantic region during imaging based on the exposure duration of each semantic region.

18 Claims, 5 Drawing Sheets

(51) Int. Cl.
*G06T 7/11* (2017.01)
*G06T 7/80* (2017.01)

(58) Field of Classification Search
CPC ... G06T 2207/20081; G06T 5/50; G06T 5/90; G06N 3/02
See application file for complete search history.

(56) References Cited

U.S. PATENT DOCUMENTS

| | | | |
|---|---|---|---|
| 2014/0336479 A1* | 11/2014 | Ando | A61B 5/0022 600/310 |
| 2020/0137288 A1* | 4/2020 | Fujikawa | H04N 25/53 |
| 2021/0089807 A1 | 3/2021 | Liu et al. | |

FOREIGN PATENT DOCUMENTS

| | | | |
|---|---|---|---|
| CN | 103380616 A | 10/2013 | |
| CN | 107566729 A | 1/2018 | |
| CN | 108353140 A | 7/2018 | |
| CN | 108683861 A | 10/2018 | |
| CN | 110249622 A | 9/2019 | |
| CN | 110493538 A | 11/2019 | |
| CN | 111225162 A | 6/2020 | |
| CN | 111767831 A | 10/2020 | |
| CN | 111835961 A | 10/2020 | |
| CN | 113393468 A | 9/2021 | |
| JP | 2001358989 A | 12/2001 | |
| JP | 2003319239 A | 11/2003 | |

\* cited by examiner

IMAGING EXPOSURE CONTROL METHOD AND APPARATUS, DEVICE AND STORAGE MEDIUM

CROSS-REFERENCE TO RELATED APPLICATIONS

The present disclosure claims the priority and benefit of Chinese Patent Application No. 202111415433.X, filed on Nov. 25, 2021, entitled "IMAGING EXPOSURE CONTROL METHOD AND APPARATUS, DEVICE AND STORAGE MEDIUM." The disclosure of the above application is incorporated herein by reference in its entirety.

TECHNICAL FIELD

The present disclosure relates to the field of computer technologies, particularly to the field of artificial intelligence technologies, such as machine learning technologies and intelligent imaging technologies, and more particularly to an imaging exposure control method and apparatus, a device and a storage medium.

BACKGROUND

Usually, a mechanical shutter is used to control an exposure duration (time period/time length/time amount) in a digital camera. All pixels in a same image have a unified exposure duration.

Usually, the exposure duration required for imaging may be first measured and calculated using a digital imaging algorithm, such as a global averaging method, a weighted averaging method, a local sampling method. Then, when it is detected that a user presses the mechanical shutter for imaging, a photographed scenario is imaged according to the measured and calculated exposure duration.

SUMMARY

The present disclosure provides an imaging exposure control method and apparatus, a device and a storage medium.

According to one aspect of the present disclosure, there is provided an imaging exposure control method, including performing semantic segmentation on a preformed image to obtain semantic segmentation images of at least two semantic regions; estimating an exposure duration of each semantic region based on the semantic segmentation images and the preformed image; and controlling exposure of each semantic region during imaging based on the exposure duration of each semantic region.

According to another aspect of the present disclosure, there is provided an electronic device, including at least one processor; and a memory connected with the at least one processor communicatively; where the memory stores instructions executable by the at least one processor to enable the at least one processor to perform the method of the aspect as described above and any possible implementation.

According to another aspect of the present disclosure, there is provided a non-transitory computer readable storage medium with computer instructions stored thereon, where the computer instructions are used for causing a computer to perform the method of the aspect as described above and any possible implementation.

According to another aspect of the present disclosure, there is provided an imaging apparatus including the above described electronic device and a liquid crystal shutter matrix including a plurality of liquid crystal shutters which are controllable by the electronic device corresponding to each semantic region during imaging to perform the exposure based on the estimated exposure duration of each semantic region.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION OF EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Apparently, the embodiments to be described are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that a terminal device in the embodiments of the present disclosure may include, but is not limited to, a mobile phone, a personal digital assistant (PDA), a wireless handheld device, a tablet computer, and other smart devices; a display device may include, but not limited to, a personal computer, a television, and other devices with a display function.

In addition, the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

In a scenario with complex light, different regions have different brightness, thereby requiring different exposure durations. Usually, a mechanical shutter is used to control the exposure duration in the prior art. All pixels in a same image have a unified exposure duration. An image may not be correctly formed with this method in a complex light environment, and the generated image tends to be overexposed or underexposed. Based on this, the present disclosure provides an imaging exposure control solution capable of being applied in the complex light environment.

Figure 1:
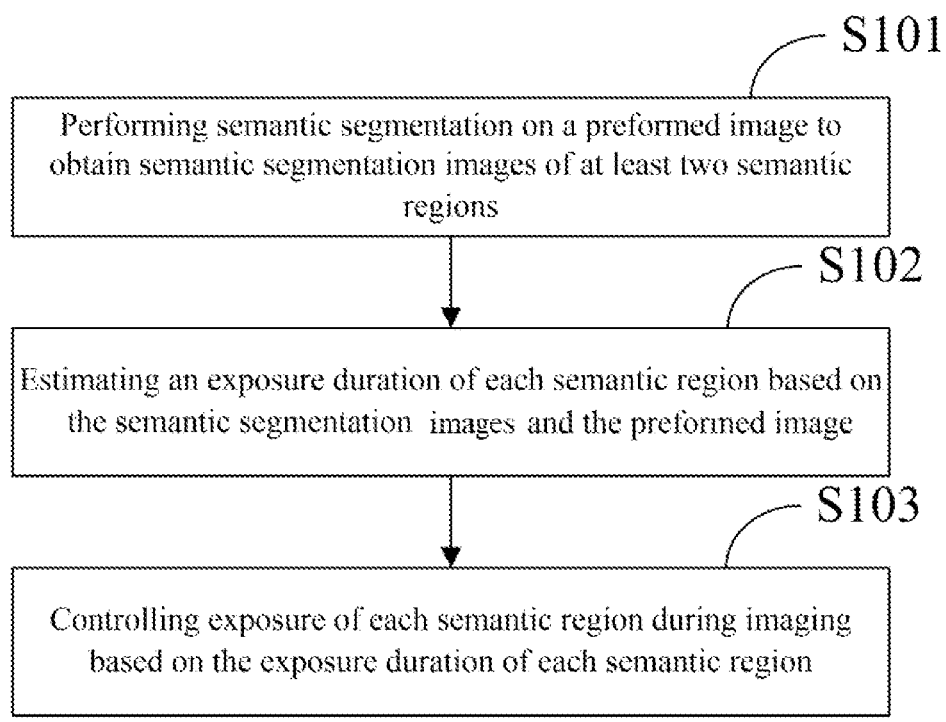
FIG. 1 is a schematic diagram according to a first embodiment of the present disclosure.

FIG. 1 is a schematic diagram according to a first embodiment of the present disclosure; as shown in FIG. 1, this embodiment provides an imaging exposure control method, which may be used in any image generation apparatus, such as a digital camera, and specifically include the following steps:

S101: performing semantic segmentation on a preformed image to obtain semantic segmentation images of at least two semantic regions;

S102: estimating an exposure duration of each semantic region based on the semantic segmentation images and the preformed image; and S103: controlling exposure of each semantic region during imaging based on the exposure duration of each semantic region.

In this embodiment, during the semantic segmentation of the preformed image, referenced semantics may be an object in the preformed image, and one object corresponds to one piece of semantics.

Since in an image shooting process, in order to fully incorporate a to-be-photographed object into the image, other related objects, such as objects included in a background, may be photographed inevitably, one image may include at least two objects, i.e., at least two pieces of semantics. For example, the object in this embodiment may be a physical object, a person, or an animal, or other objects; for example, the sky, a white cloud, a tree, a flower, a plant, or the like, may be used as an independent object. For example, when a person is photographed, in the generated image, the person is one independent object, a physical object in the person background is one object, and if an animal, the sky, or a lawn is also captured, the animal, the sky, or the lawn each is an independent object. Certainly, if the shot person image includes multiple persons, each person is one independent object.

Specifically, the semantic segmentation image including the at least two semantic regions may be obtained by recognizing different objects in the preformed image and then performing the semantic segmentation on the performed image based on a recognition result. Each semantic region corresponds to one object.

Each semantic region in the preformed image may be segmented independently by the semantic segmentation image in this embodiment, and each semantic region corresponds to one object. In order to improve imaging quality, one object in the image may correspond to one exposure duration, and objects in different semantic regions may correspond to different exposure durations. In this embodiment, the exposure duration of each semantic region may be estimated with reference to a location of each semantic region corresponding to the semantic segmentation image in the preformed image. For example, the exposure duration may be slightly shorter for a light-facing semantic region and slightly longer for a backlighting semantic region. Certainly, corresponding exposure durations may be adjusted based on different light sensitivities of the objects in the semantic regions.

The exposure of each semantic region may be controlled during photographing based on the exposure duration of each semantic region, such that the semantic regions may have different exposure durations in the shot target image, and then, the generated target image has higher quality. Compared with the prior art, since the semantic regions may have different exposure durations, the regions with different objects may have different brightness even in a scenario with complex light, and based on such concept, the overexposure or underexposure problem of the image due to the whole shot image having a same exposure duration may be solved, thereby improving imaging quality of a captured image.

In the exposure control method according to this embodiment, the semantic segmentation is performed on the preformed image to obtain the semantic segmentation images of the at least two semantic regions; the exposure duration of each semantic region is estimated; and then, the exposure of each semantic region during imaging is controlled based on the exposure duration of each semantic region, such that different exposure durations are used in different semantic regions of the same image during photographing, the overexposure or underexposure problem in the shot image may be effectively solved even in the scenario with the complex light, and the imaging quality of a captured image is improved.

Figure 2:
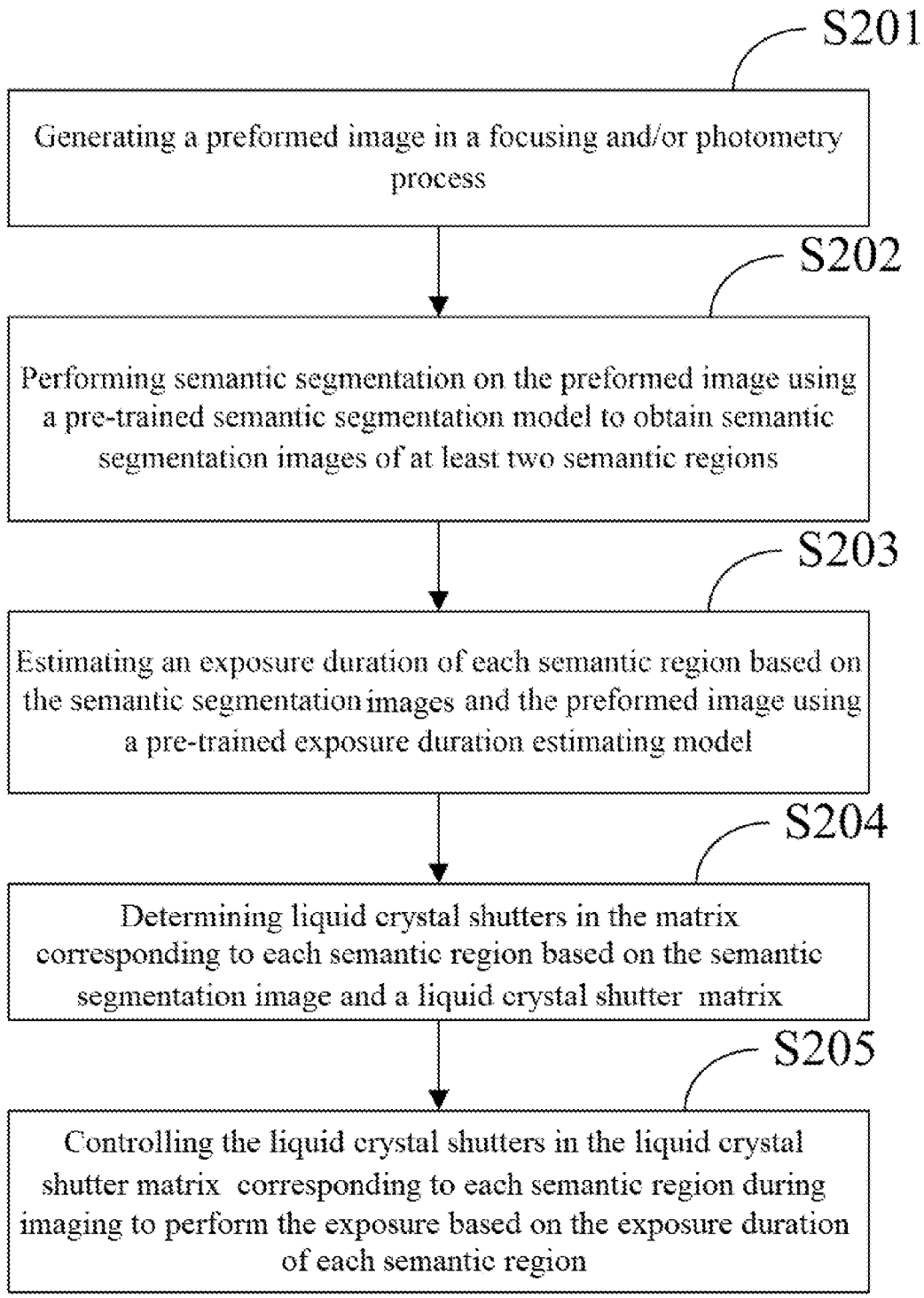
FIG. 2 is a schematic diagram according to a second embodiment of the present disclosure.

FIG. 2 is a schematic diagram according to a second embodiment of the present disclosure; this embodiment provides an imaging exposure control method, and the technical solution of the present disclosure is further introduced in more detail based on the technical solution of the above-mentioned embodiment shown in FIG. 1. As shown FIG. 2, this embodiment provides an imaging exposure control method, specifically including:

S201: generating a preformed image in a focusing and/or photometry process.

When photography is performed using an image generation apparatus, such as a digital camera, an intelligent terminal with a photographing function, a focusing or photometry operation is tried usually before photography, and at this point, an image forming apparatus may store the image as the preformed image for subsequent reference. For example, before photography, focusing of some digital cameras may be realized by lightly pressing shutters, and the preformed image may be collected at this point. For another example, screens of some intelligent terminals may be tapped to adjust the brightness during photography, this process is a photometry process, and the preformed image may also be collected at this point.

S202: performing semantic segmentation on the preformed image using a pre-trained semantic segmentation model to obtain semantic segmentation images of at least two semantic regions.

The semantic segmentation model in this embodiment is a pre-trained neutral network model. During usage, the preformed image is input into the semantic segmentation model, and the semantic segmentation model may segment each semantic region in the preformed image to obtain the semantic segmentation images of the at least two semantic regions. Specifically, after the segmentation, the semantic segmentation image of each semantic region is one independent image which only includes one object.

Optionally, in one embodiment of the present disclosure, the semantic segmentation images of the at least two semantic regions output by the semantic segmentation model may be included in an image with the same size as the preformed image, in which a boundary of each semantic region is marked to segment each semantic region.

The semantic segmentation model in this embodiment may be trained using multiple training images and semantic segmentation images of at least two pieces of semantics corresponding to each training image, such that the semantic segmentation model learns to perform semantic segmentation on the at least two semantic regions in the image.

In this embodiment, the semantic segmentation is performed on the preformed image using the semantic segmentation model, thus improving accuracy and intelligence of semantic segmentation.

S203: estimating an exposure duration of each semantic region based on the semantic segmentation images and the preformed image using a pre-trained exposure duration estimating model.

In this embodiment, the exposure duration estimating model may also be a pre-trained neural network model, the semantic segmentation images and the preformed image are input into the exposure duration estimating model during usage, and the exposure duration estimating model may predict and output the exposure durations of the semantic regions in the semantic segmentation images. The exposure duration of each semantic region in the preformed image may be estimated in this way.

When the exposure duration estimating model is trained, multiple training images and semantic segmentation images of corresponding semantics may be collected, and the exposure duration of the semantic region corresponding to each semantic segmentation image is annotated. Then, the exposure duration estimating model is trained using the above training data, such that the exposure duration estimating model may learn a capability of predicting the exposure duration of the semantic region corresponding to each semantic segmentation image.

In this embodiment, the exposure duration estimating model is used to estimate the exposure duration of each semantic region, thus effectively improving accuracy and intelligence of the exposure duration of each semantic region.

S204: determining liquid crystal shutters in the matrix corresponding to each semantic region based on the semantic segmentation image and a liquid crystal shutter matrix.

In this embodiment, the liquid crystal shutter matrix is used to control the exposure during photography. Specifically, the liquid crystal shutter is an exposure control apparatus for replacing a mechanical shutter. Different from a global liquid crystal shutter, a liquid crystal shutter matrix is adopted in this embodiment. For example, in the control apparatus, N*M tiny liquid crystal shutters are arranged in a matrix, and each liquid crystal shutter may be independently controlled and switched between a light transmitting state and a light non-transmitting state. Each tiny liquid crystal shutter corresponds to one or more pixel regions in an imaging element. During imaging, the exposure time of a corresponding region may be controlled by controlling each liquid crystal shutter. For example, the imaging element in this embodiment may be a charge coupled device (CCD) or a complementary metal oxide semiconductor (CMOS).

Specifically, according to the semantic segmentation image, the location of each semantic region in the preformed image may be determined, and then, pixels included in each semantic region may be determined. A liquid crystal shutter matrix is used for controlling exposure of a whole imaging picture, the liquid crystal shutter matrix also has a corresponding relationship with the pixels in the preformed image. For example, when enough liquid crystal shutters are included in the liquid crystal shutter matrix, one liquid crystal shutter may control exposure of one pixel, but in consideration of other factors, such as a cost, in practical applications, one liquid crystal shutter may control exposure of multiple pixels in a formed image. Based on the pixels of the semantic region corresponding to the semantic segmentation image and the pixels controlled by each liquid crystal shutter in the liquid crystal shutter matrix, the liquid crystal shutters in the matrix corresponding to each semantic region may be determined, so as to realize precise control over the exposure of each semantic region.

S205: controlling the liquid crystal shutters in the liquid crystal shutter matrix corresponding to each semantic region during imaging to perform the exposure based on the exposure duration of each semantic region.

Specifically, the liquid crystal shutters of each semantic region are controlled to perform the exposure according to the exposure duration of each semantic region; thus, different exposure durations are adopted for different semantic regions in one shot target image, such that each semantic region is exposed best, thereby solving the overexposure or underexposure problem of the target image, and effectively improving the imaging quality of the target image.

In the imaging exposure control method according to this embodiment, the accuracy of the semantic segmentation may be effectively improved using the semantic segmentation model; and the accuracy of the exposure duration of each semantic region may be effectively improved using the exposure duration estimating model. The liquid crystal shutters in the liquid crystal shutter matrix corresponding to each semantic region are controlled to perform the exposure based on the exposure duration of each semantic region to realize precise control over the exposure of each semantic region, so as to generate the target image having high quality and including each semantic region, thus effectively improving the definition and the quality of the shot target image.

Additionally, in the prior art, a multi-exposure method by shooting multiple images with different exposure durations and then fusing the multiple images into a properly exposed image. However, in the multi-exposure method, a camera is required to be kept in a still state during photography to shoot multiple images, and thus it can not be used when the image generation apparatus is moving, or when the physical objects are moving. Meanwhile, much larger storage space is required for recording multiple images, thereby wasting a large quantity of resources. A multi-exposure fusion method is required to be used for synthesizing the image subsequently, and the method is relatively cumbersome.

In the imaging exposure control method according to this embodiment, only one time of exposure is required, and a shooting cost and a post-synthesis cost is greatly reduced. Moreover, after imaging, only the preformed image, the semantic segmentation images, light sensitivity parameters, such as the exposure durations, of different semantic regions, and the generated target image are required to be stored, and compared with the multi-exposure method of shooting multiple images, the amount of data is greatly reduced, thus effectively saving a storage space.

Figure 3:
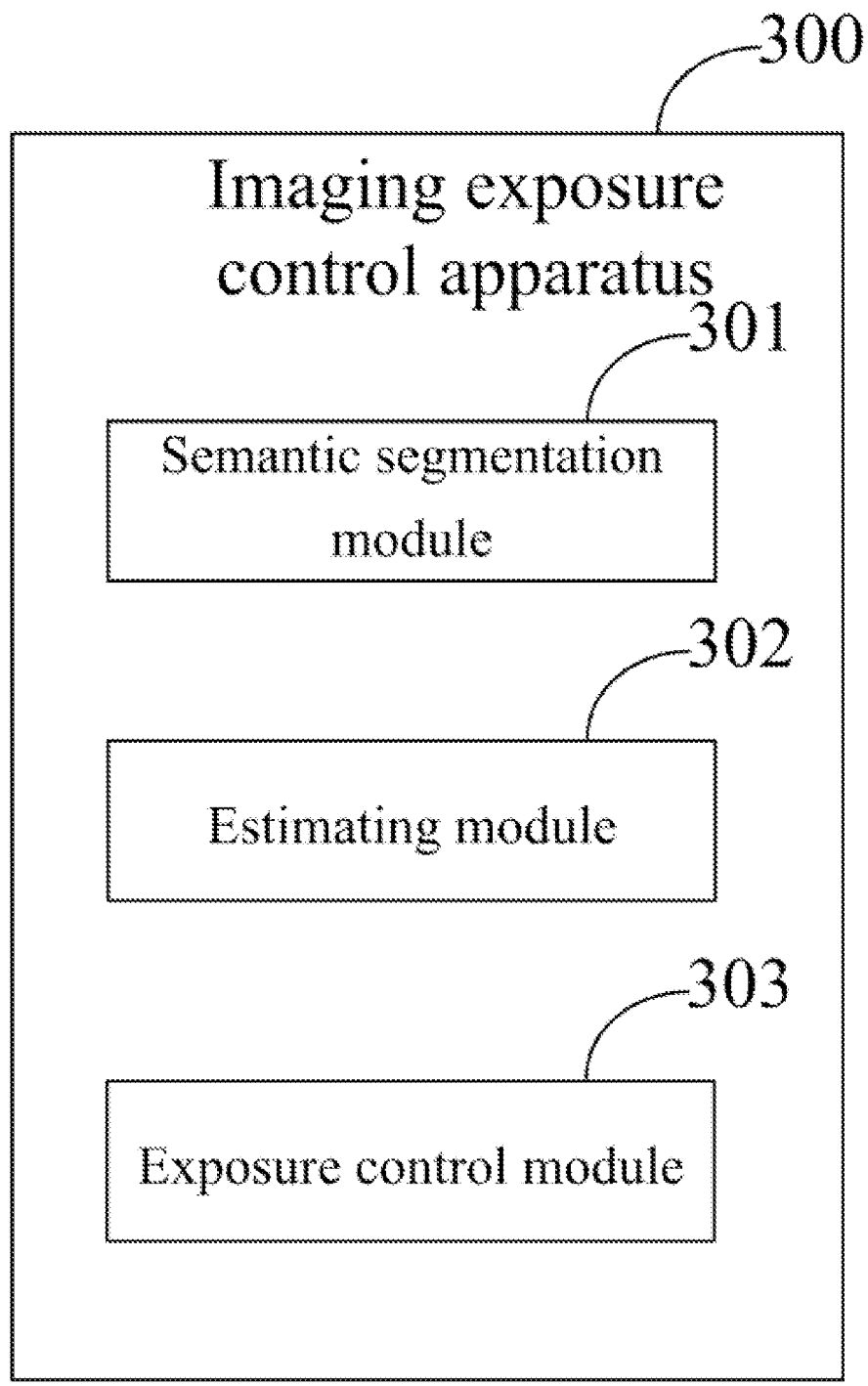
FIG. 3 is a schematic diagram according to a third embodiment of the present disclosure.

FIG. 3 is a schematic diagram according to a third embodiment of the present disclosure; as shown in FIG. 3, this embodiment provides an imaging exposure control apparatus 300, including a semantic segmentation module 301 configured to perform semantic segmentation on a preformed image to obtain semantic segmentation images of at least two semantic regions; an estimating module 302 configured to estimate an exposure duration of each semantic region based on the semantic segmentation images and the preformed image; and an exposure control module 303 configured to control exposure of each semantic region during imaging based on the exposure duration of each semantic region.

The imaging exposure control apparatus 300 according to this embodiment has the same implementation as the above-mentioned relevant method embodiment by adopting the above-mentioned modules to implement the implementation principle and the technical effects of the imaging exposure control, and for details, reference may be made to the description of the above-mentioned relevant embodiment, and details are not repeated herein.

Figure 4:
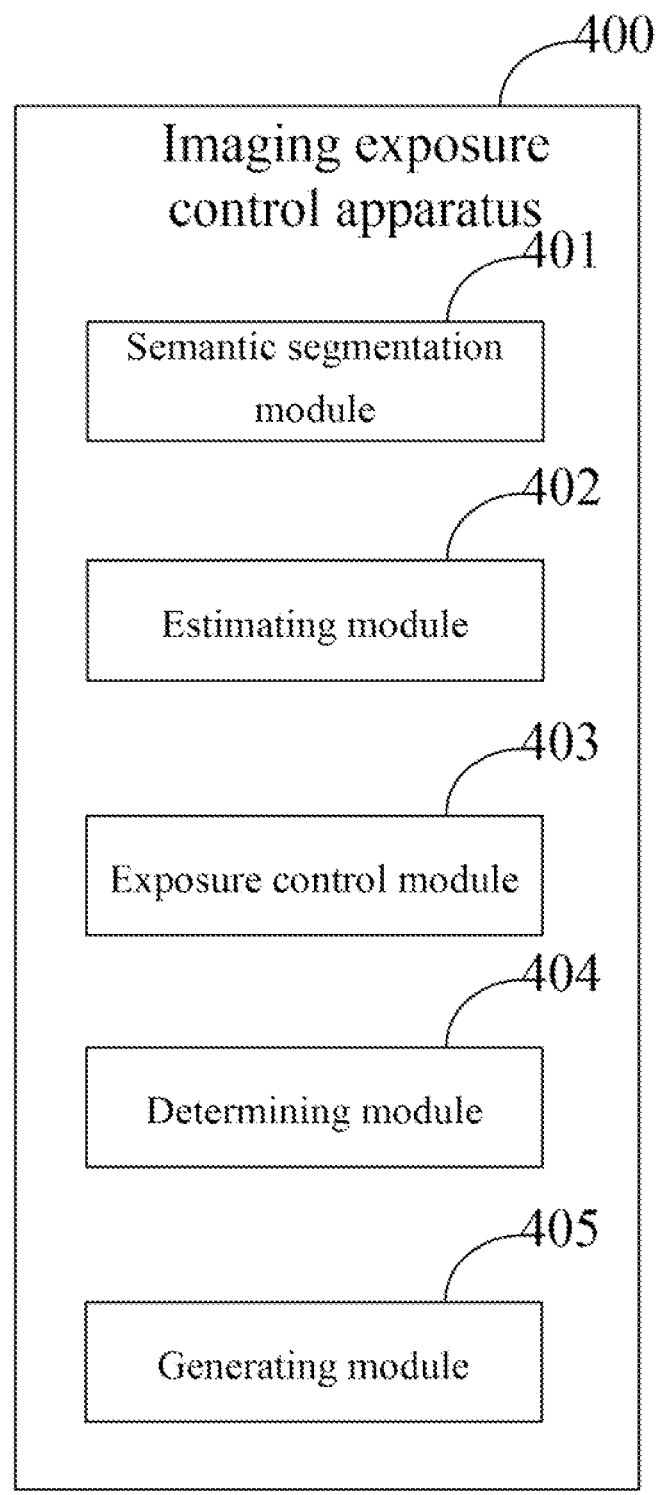
FIG. 4 is a schematic diagram according to a fourth embodiment of the present disclosure.

FIG. 4 is a schematic diagram according to a fourth embodiment of the present disclosure; as shown in FIG. 4, this embodiment provides an imaging exposure control apparatus 400, and the technical solution of the present disclosure is further described in more detail based on the above-mentioned embodiment shown in FIG. 3. As shown in FIG. 4, the imaging exposure control apparatus 400 according to this embodiment includes a semantic segmentation module 401, an estimating module 402, and an exposure control module 403, which have the same names and functions as the modules in the embodiment shown in FIG. 3.

In one embodiment of the present disclosure, the semantic segmentation module 401 is configured to perform semantic segmentation on the preformed image using a pre-trained semantic segmentation model to obtain semantic segmentation images of at least two semantic regions.

In one embodiment of the present disclosure, the estimating module 402 is configured to estimate an exposure duration of each semantic region based on the semantic segmentation images and the preformed image using a pre-trained exposure duration estimating model.

In one embodiment of the present disclosure, the exposure control module 403 is configured to control liquid crystal shutters in a liquid crystal shutter matrix corresponding to each semantic region during imaging to perform the exposure based on the exposure duration of each semantic region.

As shown in FIG. 4, in one embodiment of the present disclosure, the imaging exposure control apparatus 400 according to this embodiment further includes a determining module 404 configured to determine liquid crystal shutters in the matrix corresponding to each semantic region based on the semantic segmentation image and the liquid crystal shutter matrix.

As shown in FIG. 4, in one embodiment of the present disclosure, the imaging exposure control apparatus 400 according to this embodiment further includes a generating module 405 configured to generate the preformed image in a focusing and/or photometry process.

The imaging exposure control apparatus 400 according to this embodiment has the same implementation as the above-mentioned relevant method embodiment by adopting the above-mentioned modules to implement the implementation principle and the technical effects of the imaging exposure control, and for details, reference may be made to the description of the above-mentioned relevant embodiment, and details are not repeated herein.

This embodiment further provides an imaging device, which includes the imaging exposure control apparatus in FIG. 3 or FIG. 4, and the imaging exposure control method in FIG. 1 or FIG. 2 may be adopted specifically, so as to implement the exposure control in imaging, thus effectively improving quality of a generated image.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 5:
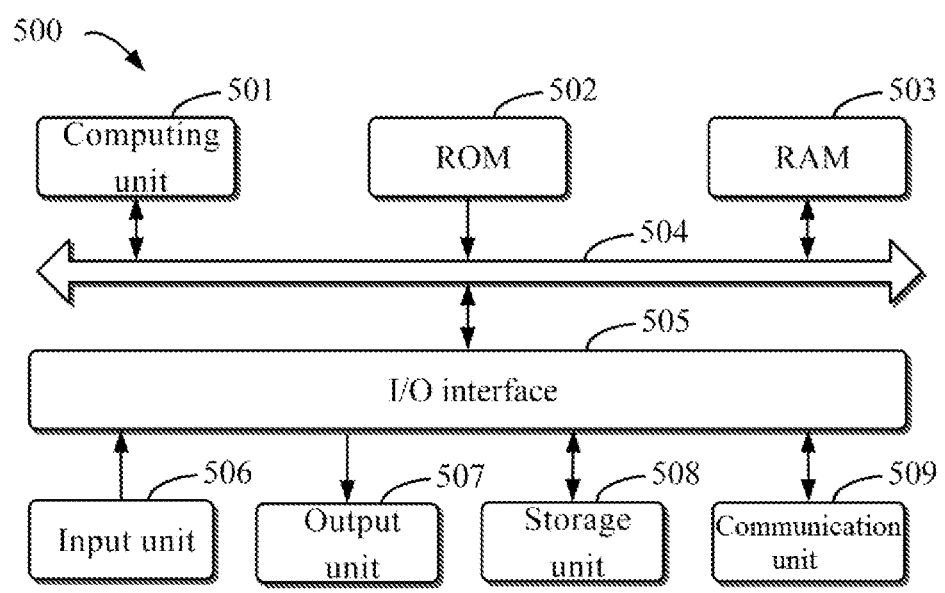
FIG. 5 is a block diagram of an electronic device configured to implement the above-mentioned method according to some embodiments of the present disclosure.

FIG. 5 shows a schematic block diagram of an exemplary electronic device 500 which may be configured to implement the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile devices, such as personal digital assistants, cellular telephones, smart phones, wearable devices, and other similar computing devices. The components shown herein, their connections and relationships, and their functions, are meant to be exemplary only, and are not meant to limit implementation of the present disclosure described and/or claimed herein.

As shown in FIG. 5, the device 500 includes a computing unit 501 which may perform various appropriate actions and processing operations according to a computer program stored in a read only memory (ROM) 502 or a computer program loaded from a storage unit 508 into a random access memory (RAM) 503. Various programs and data necessary for the operation of the device 500 may be also stored in the RAM 503. The computing unit 501, the ROM 502, and the RAM 503 are connected with one other through a bus 504. An input/output (I/O) interface 505 is also connected to the bus 504.

The multiple components in the device 500 are connected to the I/O interface 505, and include: an input unit 506, such as a keyboard, a mouse, or the like; an output unit 507, such as various types of displays, speakers, or the like; the storage unit 508, such as a magnetic disk, an optical disk, or the like; and a communication unit 509, such as a network card, a modem, a wireless communication transceiver, or the like. The communication unit 509 allows the device 500 to exchange information/data with other devices through a computer network, such as the Internet, and/or various telecommunication networks.

The computing unit 501 may be a variety of general and/or special purpose processing components with processing and computing capabilities. Some examples of the computing unit 501 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 501 performs the methods and processing operations described above, such as the method according to the present disclosure. For example, in some embodiments, the method according to the present disclosure may be implemented as a computer software program tangibly contained in a machine readable medium, such as the storage unit 508. In some embodiments, part or all of the computer program may be loaded and/or installed into the device 500 via the ROM 502 and/or the communication unit 509. When the computer program is loaded into the RAM 503 and executed by the computing unit 501, one or more steps of the method according to the present disclosure may be performed. Alternatively, in other embodiments, the computing unit 501 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input device, and at least one output device.

Program codes for implementing the method according to the present disclosure may be written in any combination of one or more programming languages. These program codes may be provided to a processor or a controller of a general purpose computer, a special purpose computer, or other programmable data processing devices, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display device (for example, a cathode ray tube (CRT) or liquid crystal display (LCD) monitor) for displaying information to a user; and a keyboard and a pointing device (for example, a mouse or a trackball) by which a user may provide input for the computer. Other kinds of devices may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. An imaging exposure control method, comprising:
    performing semantic segmentation on a preformed image to obtain semantic segmentation images of at least two semantic regions, each semantic region corresponds to one object;
    estimating an exposure duration of each semantic region based on the semantic segmentation images and the preformed image; and
    controlling liquid crystal shutters in a liquid crystal shutter matrix corresponding to each semantic region during imaging to perform exposure of each semantic region based on the exposure duration of each semantic region, so as to obtain an image in which different objects can correspond to different exposure duration.

2. The method according to claim 1, wherein the performing semantic segmentation on the preformed image to obtain semantic segmentation images of at least two semantic regions comprises:
    performing the semantic segmentation on the preformed image using a pre-trained semantic segmentation model to obtain the semantic segmentation images of the at least two semantic regions.

3. The method according to claim 1, wherein the estimating the exposure duration of each semantic region based on the semantic segmentation images and the preformed image comprises:
    estimating the exposure duration of each semantic region based on the semantic segmentation images and the preformed image using a pre-trained exposure duration estimating model.

4. The method according to claim 1, further comprising: before the controlling liquid crystal shutters in a liquid crystal shutter matrix corresponding to each semantic region during imaging to perform the exposure based on the exposure duration of each semantic region, determining the liquid crystal shutters in the matrix corresponding to each semantic region based on the semantic segmentation image and the liquid crystal shutter matrix.

5. The method according to claim 1, further comprising: before the performing semantic segmentation on the preformed image to obtain semantic segmentation images comprising at least two semantic regions,
generating the preformed image in a focusing and/or photometry process.

6. The method according to claim 1, wherein each of the liquid crystal shutters in the liquid crystal shutter matrix is independently controlled and switched between a light transmitting state and a light non-transmitting state, and each of the liquid crystal shutters corresponds to one or more pixel regions in an imaging element.

7. An electronic device, comprising:
at least one processor; and
a memory connected with the at least one processor communicatively;
wherein the memory stores instructions executable by the at least one processor to enable the at least one processor to perform an imaging exposure control method comprising:
performing semantic segmentation on a preformed image to obtain semantic segmentation images of at least two semantic regions, each semantic region corresponds to one object;
estimating an exposure duration of each semantic region based on the semantic segmentation images and the preformed image; and
controlling liquid crystal shutters in a liquid crystal shutter matrix corresponding to each semantic region during imaging to perform exposure of each semantic region based on the exposure duration of each semantic region, so as to obtain an image in which different objects can correspond to different exposure duration.

8. The electronic device according to claim 7, wherein the performing semantic segmentation on the preformed image to obtain semantic segmentation images of at least two semantic regions comprises:
performing the semantic segmentation on the preformed image using a pre-trained semantic segmentation model to obtain the semantic segmentation images of the at least two semantic regions.

9. The electronic device according to claim 7, wherein the estimating the exposure duration of each semantic region based on the semantic segmentation images and the preformed image comprises:
estimating the exposure duration of each semantic region based on the semantic segmentation images and the preformed image using a pre-trained exposure duration estimating model.

10. The electronic device according to claim 7, wherein the method further comprises: before the controlling liquid crystal shutters in a liquid crystal shutter matrix corresponding to each semantic region during imaging to perform the exposure based on the exposure duration of each semantic region,
determining the liquid crystal shutters in the matrix corresponding to each semantic region based on the semantic segmentation image and the liquid crystal shutter matrix.

11. The electronic device according to claim 7, wherein the method further comprises: before the performing semantic segmentation on the preformed image to obtain semantic segmentation images comprising at least two semantic regions,
generating the preformed image in a focusing and/or photometry process.

12. A non-transitory computer readable storage medium with computer instructions stored thereon, wherein the computer instructions are used for causing a computer to perform an imaging exposure control method comprising:
performing semantic segmentation on a preformed image to obtain semantic segmentation images of at least two semantic regions, each semantic region corresponds to one object;
estimating an exposure duration of each semantic region based on the semantic segmentation images and the preformed image; and
controlling liquid crystal shutters in a liquid crystal shutter matrix corresponding to each semantic region during imaging to perform exposure of each semantic region based on the exposure duration of each semantic region, so as to obtain an image in which different objects can correspond to different exposure duration.

13. The non-transitory computer readable storage medium according to claim 12, wherein the performing semantic segmentation on the preformed image to obtain semantic segmentation images of at least two semantic regions comprises:
performing the semantic segmentation on the preformed image using a pre-trained semantic segmentation model to obtain the semantic segmentation images of the at least two semantic regions.

14. The non-transitory computer readable storage medium according to claim 12, wherein the estimating the exposure duration of each semantic region based on the semantic segmentation images and the preformed image comprises:
estimating the exposure duration of each semantic region based on the semantic segmentation images and the preformed image using a pre-trained exposure duration estimating model.

15. The non-transitory computer readable storage medium according to claim 12, wherein the method further comprises: before the controlling liquid crystal shutters in a liquid crystal shutter matrix corresponding to each semantic region during imaging to perform the exposure based on the exposure duration of each semantic region,
determining the liquid crystal shutters in the matrix corresponding to each semantic region based on the semantic segmentation image and the liquid crystal shutter matrix.

16. The non-transitory computer readable storage medium according to claim 12, wherein the method further comprises: before the performing semantic segmentation on the preformed image to obtain semantic segmentation images comprising at least two semantic regions,
generating the preformed image in a focusing and/or photometry process.

17. An imaging apparatus, comprising:
an electronic device, comprising: at least one processor; and a memory connected with the at least one processor communicatively; wherein the memory stores instructions executable by the at least one processor to enable the at least one processor to perform an imaging exposure control method comprising:
performing semantic segmentation on a preformed image to obtain semantic segmentation images of at least two semantic regions, each semantic region corresponds to one object;

estimating an exposure duration of each semantic region based on the semantic segmentation images and the preformed image; and controlling exposure of each semantic region during imaging based on the exposure duration of each semantic region; and a liquid crystal shutter matrix comprising a plurality of liquid crystal shutters which are controllable by the electronic device corresponding to each semantic region during imaging to perform the exposure based on the estimated exposure duration of each semantic region, so as to obtain an image in which different objects can correspond to different exposure duration.

18. The imaging apparatus according to claim 17, wherein each of the liquid crystal shutters is used for controlling exposure of one or more pixels of a captured image.

* * * * *